Jan. 10, 1967   W. S. AUSHERMAN   3,297,037

CONCAVE FOR THRESHING CYLINDERS

Filed Nov. 27, 1963

INVENTOR.
WILLIAM S. AUSHERMAN
BY Robert E. Breidenthal
ATTORNEY

United States Patent Office 3,297,037
Patented Jan. 10, 1967

3,297,037
CONCAVE FOR THRESHING CYLINDERS
William S. Ausherman, Wichita, Kans.
(Belleville, Kans. 66935)
Filed Nov. 27, 1963, Ser. No. 326,468
3 Claims. (Cl. 130—27)

This invention relates to new and useful improvements in concaves for use with rotating threshing cylinders, and more particularly pertains to a concave of such character that includes longitudinally extending rows of longitudinally spaced teeth for coacting with the rasp bars of a rotating cylinder for threshing the grain seed or seedlike fruit from the heads, pods, stock or stems of various food or crop plants of such character as to be susceptible to threshing operations, as for example, sorghums, legumes, wheat, oats, barley, rye, millet, rice, soybeans, flax, clover, corn, etc.

The primary object of the present invention is to provide a concave which in combination with a threshing cylinder will separate the desired food product with a high degree of efficiency and with a minimum degree of damage to the same in such a manner as to require less power and enable such threshing operation to be conducted over a wider range of moisture conditions than is usually deemed practicable.

Another important object of the invention closely related to the foregoing object is to provide a concave such that the same can be further spaced from the cylinder than is the normal spacing, and with such greater spacing not resulting in a sharp decrease in threshing efficiency, but rather being accompanied by a reduction in power consumption less damage to the desired product, and with a decreased likelihood of the equipment becoming jammed or clogged.

Still another object of the invention is to provide a concave such that the travel path of material passing between the concave and the cylinder will tend to travel a zigzag path so as to contribute to a uniform distribution of material throughout the length of the concave, with the result being a generally uniform wear rate throughout the length of the concave and the cylinder and a high efficiency of separation for the reason that there is a greatly reduced tendency for unseparated material to channel through the apparatus.

Still another object of the invention is to provide an open concave, that is, a concave having openings therethrough such that the action of the threshing cylinder and the material passing between the cylinder and the concave tends to maintain such openings free of obstructions or clogging.

Still another object of the invention is to provide a concave of the character specified above which includes replaceable and preferably reversible sets of teeth, whereby the frame or body of the concave has an indefinite life, and whereby the teeth can be readily replaced or preferably reversed so as to approximately double the life thereof.

Yet another important object of this invention is to provide a concave such that the base or frame thereof is of such character that the same can be made of sheet metal of a somewhat corrugated formation, whereby a great economy in weight and materials can be effected, and yet such structure will possess adequate strength.

Broadly, the threshing concave of the instant invention comprises an elongated, toothed frame, said frame having a concave configuration on one side thereof substantially concentric about a line parallel to the longitudinal dimension of the frame, said configuration of said frame being at least in part defined by a plurality of longitudinally extending, parallel rows of longitudinally spaced teeth, with all of said teeth extending toward said line and terminating substantially equidistant therefrom.

Preferably, the concave specified in the preceding paragraph is such that the rows of teeth are spaced from each other, with the teeth of each row being inclined, and with the teeth of adjacent rows of teeth being inclined in opposite directions. Except when the concave is to be used in threshing equipment or combines not provided with a grain pan (a collecting pan or tray disposed below the concave, that is, on the side of the concave opposite the threshing cylinder) such as some machines manufactured and sold by Baldwin, the concave is provided with openings intermediate the rows of teeth for the passage of the grain or desired food product therethrough.

When the concave is such as specified in the preceding paragraphs and includes openings in the same intermediate the rows of teeth, it is preferred that the portions of the concave intermediate the rows of teeth be equidistant from the line with respect to which the concave is concentric as the bottom of the teeth, that is, the surface of the web or like structure from which the teeth project.

Another broad aspect of the present invention resides in the provision of a concave constituted of a base, which can be of suitably heavy gauge sheet metal, that is of zigzag or corrugated character to define alternate ridges and valleys of an over-all generally arcuate configuration, together with rasp bars seated in the valleys and secured to the base in an arrangement such that the teeth of the rasp bars project above the ridges intervening between the rasp bars.

Other objects, aspects, features and advantages of the invention will become apparent in the light of the following description of preferred embodiments of the invention take in conjunction with the accompanying drawings, wherein.

Figure 1:
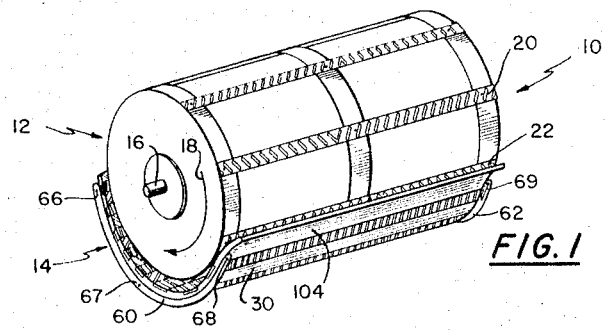
FIGURE 1 is an isometric view of a concave according to the invention, the same being shown in operative relation with a rotary threshing cylinder.

Referring now to the accompanying drawings, wherein like numerals designate similar parts throughout the various views, and initially directing attention to the form of the invention shown in FIGURES 1 through 5 inclusive, the reference numeral 10 designates generally a rotary threshing cylinder in operative relation relative to a threshing concave, the threshing cylinder and the concave being respectively designated generally at 12 and 14.

The threshing cylinder 12 includes a central longitudinal axle 16 by means of which the same is rotatably mounted in a combine or threshing machine of conventional character, not shown, and by means of which the same is rotatably driven to rotate in the direction indicated by the arrow 18. The threshing cylinder 12 also includes a plurality of longitudinally extending, circumferentially spaced rasp bars such as indicated at 20 and 22. The rasp bars 20 and 22 can be of any conventional character, and are preferably of the reversible types such as disclosed in my copending application Serial No. 289,496 filed June 21, 1963 now Patent No. 3,203,428 issued August 31, 1965, and entitled Improved Cylinder Bar, or such as dislosed in my U.S. Patent No. 3,034,513 issued May 15, 1962, entitled Reversible Bar for Threshing Cylinders. Inasmuch as threshing cylinders are well known in the art both as to the wide variety of structures heretofore available commerically or proposed, as well as with respect to their cooperative function with concaves, further detailed description of the threshing cylinder 12 is deemed unnecessary as the subject invention deals exclusively with the concave and is not in anywise limited to the particular character of the rotary threshing cylinder to be employed therewith.

The general organization and cooperative relation of threshing cylinders and concaves is well illustrated in a brochure publicly distributed by the John Deere Company entitled Self-Propelled Combines and being designated at the lower left corner of the back cover (page 40) of the brochure as "A1241-59-8-Harvester." Such brochure includes on pages 12, 13, 14, 15 and on the inside of a fold-out sheet at the center of such publication excellent illustrations of typical associations of threshing cylinders and concaves with cooperating equipment, and such disclosures are incorporated by reference.

Figure 2:
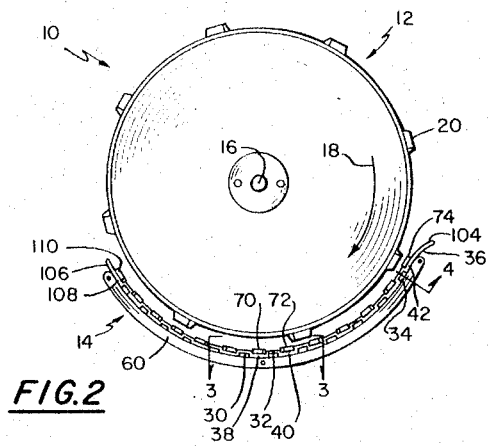
FIGURE 2 is an end elevational view on an enlarged scale of the structure shown in FIGURE 1.
Figure 5:
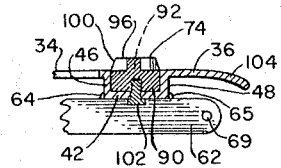
FIGURE 5 is an enlarged sectional detail view taken upon the plane of the section line 5—5 in FIGURE 4.

The concave 14 comprises a frame or base 30 that is elongated and having a concave configuration on one side thereof that is generally concentric about a straight line, such straight line coinciding with the axis of the shaft 16 when the spacing of the concave 14 is adjusted with respect to the cylinder 12 as to be uniformly spaced therefrom. In the preferred form of the frame or base 30 illustrated the latter is substantially throughout its arcuate extent of zigzag or generally corrugated form so as to constitute alternate longitudinally extending ridges 30, 32, 34 and 36 and valleys 38, 40 and 42. As best shown in FIGURES 2 and 5, the surfaces of the ridges 30 through 36 presented toward the cylinder 12 tend to be flat or of generally rectangular configuration, and the surfaces of the valleys 38 through 42 presented toward the cylinder also tend to be flat or rectangular. Such surfaces are referred to as being rectangular to imply not only that such surfaces are substantially flat, but that in addition the transverse edges of such surfaces are rather sharply defined by the portions of the frame or base 30 connecting the ridges and valleys constituting rather abrupt discontinuities therewith. The character of such portions is exemplified by the base or frame portion 46 (see FIGURE 5) connecting the ridge 34 and the valley 42, and by the frame or base portion 48 connecting the valley 42 to the ridge 36. It will be noted that the frame or base portions 46 and 48 are inclined nearly 90° to the flat surfaces 34 and 42, and 36 and 42, respectively. It is preferred that the frame or base portions 46 and 48 be slightly divergent toward the cylinder 12 so that a rasp bar can be most readily received therebetween and seated against the valley 42 in a manner to be subsequently described. Also such divergence of the frame or base portions defining the opposite sides of each of the valleys is preferably divergent toward the cylinder 12 in order to facilitate the manufacturer of the frame or base 30 when the same is to be made by casting. It will also be noted that when the portions connecting valleys and ridges are of uniform wall thickness and divergent as shown in FIGURE 5 that the arrangement is such that the wall portions and opposite sides of each ridge are divergent away from the cylinder 12 so as to facilitate casting.

While the frame or base 30 can be fabricated from metal by casting, so as to provide a relatively ligth weight construction considering the mode of fabrication, it is preferred however that the frame or base 30 be fabricated by stamping or bending from a single sheet of steel.

It will be apparent to those skilled in the art that the zigzag or corrugated configuration of the frame or base 30 is of a particularly strong design with respect to any stresses applied thereto such as to bend the same about a transverse dimension. Means is provided for reinforcing the frame or base 30 as thus far decribed against any bending thereof about a longitudinal axis, such means also constituting means whereby the concave 14 can be readily secured to the side walls of a combine or threshing machine. Such means constitutes a pair of arcuate steel mounting flanges 60 and 62 disposed below the opposite longitudinal extremities of the frame or base 30, such mounting flanges 60 and 62 being in abutment against the underside of all of the valleys and welded thereto as indicated at 64 and 66 in relation to the valley 42 shown in FIGURE 5. The mounting flanges 60 and 62 are each provided with a plurality of openings therethrough such as the openings designated at 70, 72 74 and 76 whereby the flanges 60 and 62 can be secured to the opposite side walls of a threshing machine or combine, not shown. It will be appreciated by those familiar with threshing equipment that the flanges 60 and 62 augmented by the strength of the side walls of the threshing machine or combine will impart great strength to the concave 14. Of course such strength of the concave 14 is greatly augmented by the concave or arcuate configuration of the same and the corrugated nature of the structure of the frame or base 30.

Figure 3:
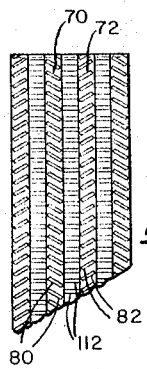
FIGURE 3 is a broken elevational view of a portion of the concave shown in FIGURES 1 and 2, this view being taken upon the plane of the broken section line 3—3 in FIGURE 2.

As best shown in FIGURES 2 and 5, rasp bars are fitted in each of the valleys of the frame or base 30 as indicated by the rasp bars 70, 72 and 74 fitted in the valleys 38, 40 and 42, respectively. Each of the rasp bars 70, 72 and 74 are preferably of the general character shown in my Patent No. 3,034,513 issued May 15, 1962, and entitled Reversible Bar for Threshing Cylinders, and differs therefrom in the fact that all of the teeth on each of the rasp bars are inclined in the same direction rather than being inclined in two directions. That the teeth of each bar are all inclined in one direction will be evident upon considering the inclination of the teeth 80 and 82 of the rasp bars 70 and 72 as shown in FIGURE 3. While all of the teeth of each individual rasp bar are inclined in the same direction, it is expressly noted that the teeth of adjacent bars are inclined in opposite directions as may be noted with respect to the teeth 80 and 82 of the adjacent rasp bars 70 and 72 as shown in FIGURE 3.

Yet another of the features of the rasp bar illustrated and described in my previously mentioned patent can be and is preferably omitted, namely, the web of the rasp bar being of a maximum thickness intermediate the transverse extent of the teeth. In other words, it is preferred that the rasp bars 70, 72 and 74 have teeth that are substantially of the same vertical extent throughout their transverse extent. This preference together with the manner in which the rasp bars are detachably secured to the frame or base 30 is brought out in FIGURE 5. The rasp bar includes a web 90 of substantially uniform thickness such that the bottom of the web 90 seats in the valley 42 and the top of the web 90 partially indicated in dashed lines at 92 is substantially flat and even with the top surfaces of the ridges 34 and 36. The rasp bar 74 includes teeth 96, all of which are inclined in a single direction as are the teeth 80 of the rasp bar 70. The teeth 96 as well as the teeth 80 and 82 of the rasp bars 70 and 72 are all beveled at their transverse extremities in the same manner as the teeth of the rasp bar disclosed in my previously mentioned Patent No. 3,034,513. Such a beveled and sharpened end of one of the teeth 96 of the rasp bar 74 is indicated at 100 in FIGURE 5.

The rasp bars 70, 72 and 74 are detachably secured to the frame or base 30 by means of cap screws threaded into the underside of the bars through valley portions of the base, such as by the cap screw 102 shown extending through the valley 42 into the web 90 of the rasp bar 76, a plurality of longitudinally spaced cap screws are used for each rasp bar.

As clearly brought out in FIGURES 2 and 5, the teeth 80, 82 and 96 of the rasp bars 70, 72 and 74 project toward the shaft 16 of the cylinder 12. It will be observed that each tooth is of substantially uniform height throughout its transverse extent and that all of the teeth of all of the rasp bars terminate substantially equidistant from the shaft 16.

It will be noted that the ridge 36 of the frame or base 30 is adjacent a transverse edge of the concave 14, and that such ridge 36 is transversely extended and flared or bent away from the shaft 16 of the cylinder 12 to constitute a rounded lip 104 extending the longitudinal extent of the concave 14. Such lip 104 is disposed adjacent the forward ends of the mounting and reinforcing flanges 60 and 62. The transverse edge of the base or frame opposite the lip 104 is simply a short extension 106 of a valley 108 in which a rasp bar 110 is releasably secured. Transverse marginal edge 106 overlies the rear edges or ends of the reinforcing and mounting flanges 60 and 62.

Optionally, the portions of the frame or base 30 constituting the ridges 30 through 36 can be imperforate as is preferred when the concave 14 is not underlaid by a grain pan, not shown, such as is the case with some threshing machines produced by Baldwin; however, a very large number of threshing machines or combines are provided with such grain pans, in which case it is preferred that the portions of the frame or base 30 constituting the flat portions of the ridges 30 through 36 each be provided with a plurality of openings such as indicated at 112 in relation to the ridge 32. It will be noted that the openings are elongated in a direction transverse to the longitudinal extent of the concave 14 and each substantially extends the entire transverse extent of the ridge 32. It will be appreciated that inasmuch as the base 30 and the ridge portion 32 thereof are of relatively thin construction the likelihood of material lodging in or clogging the openings 112 is greatly reduced. It will be understood that all of the ridges of the frame or base 30 with the solitary exception of the ridge 36 are provided with openings such as the openings 112 in the ridge 32.

From the foregoing, the operation of the concave 14 in cooperation with the threshing cylinder 12 will be easily understood. With the threshing cylinder 12 rotating in the direction indicated by the arrow 18, the material to be threshed is introduced between the threshing cylinder 12 and the lip 104 in the conventional manner whereupon the rasp bars 20 and 22 act upon the material being threshed in the conventional manner so as to separate grain from straw and chaff, for example, assuming wheat is being threshed. The materials are acted upon during their passage between the concave 14 and the threshing cylinder 12 so as to separate the grain, with such action being facilitated by the character of the concave of this invention in that the oppositely inclined teeth of adjacent rasp bars of the concave 12 tend to spread the material evenly along the length of the concave 14 and to cause the same to follow a zigzag path during their passage. When the concave 14 is provided with openings such as those illustrated at 112, the freed grain to a very large extent passes through the openings 112 for deposit upon the grain pan, not shown, below the concave 14. Inasmuch as the upper surfaces of the webs of the rasp bars are approximately equidistant from the shaft 16 with the upper surfaces of the ridges intermediate the rasp bars, material passing over the ridges tends to sweep the surfaces of the latter clean and to free the entrances to such openings 112 so that the latter do not become clogged with debris, juices and the like. Since the base or frame 30 can be of relatively thin construction, the openings 112 are of short radial extent, and the likelihood of materials becoming lodged therein is greatly reduced.

Greater threshing efficiency is realized by virtue of the inclination of the teeth and in view of the further fact that the teeth of adjacent rasp bars are oppositely inclined, with the beneficial result that a greater spacing is possible between the concave 14 and the cylinder 12 than would be otherwise possible to achieve the same degree of threshing efficiency. Such greater spacing results in less power being required to rotate the cylinder 12 together with the additional benefit of there being a greatly reduced likelihood of materials entering into the space between the cylinder 12 and the concave 14 massing to such an extent as to clog and perhaps jam and freeze the cylinder 12 against rotation.

While ordinarily it is preferred that the concave 14 be adjusted so as to be concentric with the shaft 16, it is possible in the use of the concave 14 to position the transverse edge 106 of the concave 14 closer to the cylinder 12 than the inlet transverse margin (along the lip 104 edge), whereby material can be fed into the space between the cylinder 12 and the concave 14 at a greater rate than would otherwise be possible. Jamming or freezing of the equipment with the concave 14 adjusted in the manner last described is rendered very unlikely because of the tendency of the teeth of the rasp bars of the concave 14 to uniformly distribute the material along the longitudinal extent of the apparatus.

It will be appreciated in the use of the apparatus that the greater the spacing of the concave 14 from the cylinder 12 the less the likelihood of the desired product being damaged by bruising or cracking. Also such greater spacing is attended by the advantage that the material can have a greater moisture content than would otherwise be the case, and still operate with a good separation efficiency, no clogging of the openings 112 and with very little likelihood of the apparatus being jammed to freeze the cylinder 12 against rotation.

Inasmuch as the transverse extremities of each of the teeth of all the rasp bars of the concave 14 are beveled and sharpened, it is possible after the teeth have become worn at one transverse end to reverse the positions of each of the rasp bars end-for-end and enjoy a substantially doubled useful lifetime of the concave 14. Obviously, after the teeth have become entirely worn at both transverse extremities, the rasp bars can be readily replaced without any need to replace the frame or base 30.

Figure 6:
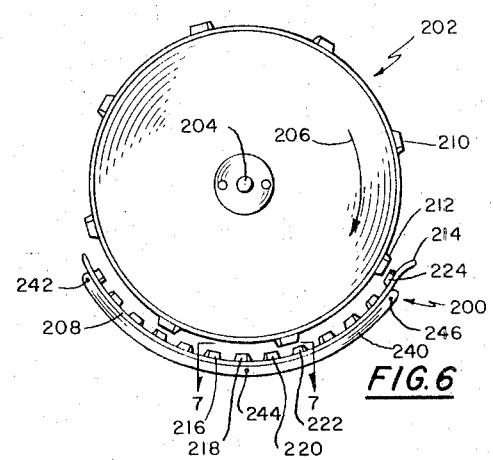
FIGURE 6 is an end elevational view of a modified form of concave according to the invention, the same being shown in operative relation with a rotary threshing cylinder; and, FIGURE 7 is an elevational view of a portion of the concave shown in FIGURE 6, this view being taken upon the plane of the broken section line 7—7 in FIGURE 6.
Figure 7:
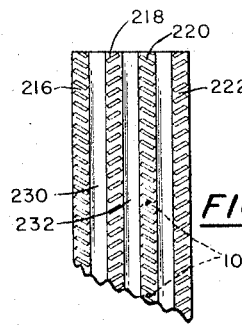
Figure 4:
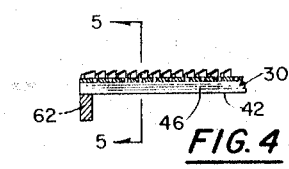
FIGURE 4 is an enlarged sectional detail view taken upon the plane of the section line 4—4 in FIGURE 2.

Attention is now directed to the form of the invention shown in FIGURES 6 and 7. The concave designated generally at 200 of this form of the invention is employed in conjunction with a threshing cylinder 202 generally identical to the previously described threshing cylinder 12, the threshing cylinder 202 including an axle 204 and being mounted for rotation indicated by the arrow 206.

The concave 200 comprises a frame or base 208 of arcuate configuration, the same having a side concentric about a straight line, such straight line being coincident with the axis of the shaft 204 in the relatively adjusted positions of the concave 200 and the cylinder 202 shown in FIGURE 6.

The cylinder 202 includes rasp bars 210 and 212 such as the previously described rasp bars 20 and 22 of the cylinder 12 shown in FIGURE 1, and the frame or base 208 is along a lateral margin towards which the rasp bars 210 and 212 advance during rotation in the direction indicated by the arrow 206 turned away from the cylinder 202 to constitute an arcuate lip 214 generally similar to the previously described lip 104.

In spaced parallelism along the side of the frame or base 208 facing the cylinder 202, a plurality of rasp bars 216, 218, 220, 222 and 224 are secured to the frame or base 208. The rasp bars 216 through 224, inclusive, are each detachably secured to the frame or base 208 by cap screws, not shown, threaded thereinto through the frame or base 208 in a manner generally similar to that shown in FIGURE 5 wherein the cap screw 102 is threaded through the frame or base 30 into the rasp bar 74. The rasp bars 218 and 222 are generally similar to the previously described rasp bar 72, and the rasp bars 216 and 220 are generally similar to the previously described rasp bar 70. The important point is that all of the teeth of each of the rasp bars 216 through 224 have inclined teeth with all of the teeth of each rasp bar being inclined in the same direction. Also, the teeth of adjacent rasp bars are inclined in opposite directions. Inasmuch as the heights of the teeth of all of the rasp bars 216 through 224 are of the same height, the outer extremities of all of such teeth are equidistant from the straight line about which the surface of the frame or base 208 is concentric or from which it is uniformly spaced.

When the concave 200 is to be employed with combines or threshing machines of the type designed for use with closed concaves, such as machines of Baldwin manufacture, the spaces between the rasp bars 216 through 224, such as those indicated at 230 and 232, are imperforate; however, it will be understood by those skilled in the art that when the concave 200 is to be employed in threshing machines or combines of the type adapted for use with open concaves (that is, such machines including a grain pan), the spaces of the frame or base 208 intermediate the various rasp bars such as those indicated at 230 and 232 can be provided with spaced perforations or openings such as those indicated at 112 in FIGURE 3.

For the purpose of mounting and reinforcing the concave 200, the latter includes at its opposite longitudinal extremities an arcuate mounting flange such as the flange indicated at 240 in FIGURE 6, such arcuate mounting flange 240 being welded securely to the frame or base 208. The mounting flange 240 is provided with openings 242, 244, and 246, whereby the concave 200 can be secured to the opposite side walls of the threshing machine or concave, by suitable bolts or rivets.

As in the case of the base or frame 30, the base or frame 208 can and preferably is formed of a single integral piece of sheet steel by stamping or rolling.

Both of the illustrated and described embodiments of the concave of this invention can be used as replacements for concaves in extant threshing machines or combines, or the same can be utilized as original equipment in such apparatus. Both forms of the invention enjoy the advantages of greater efficiency and freedom from difficulty such as may be occasioned by the moisture content of the materials being threshed, inflict minimum damage on the desired product, and enjoy prolonged useful lives by reason of the reversibility of the rasp bars included in the concaves. In the latter regard, the concaves can be conveniently restored to essentially new condition upon mere replacement of the rasp bars that have become worn during their forward and reverse utilization.

Inasmuch as it will be amply apparent that each of the illustrated and described preferred embodiments of the invention are susceptible to numerous variations and modifications without departing from the spirit of the invention, attention to the appended claims is invited in order to ascertain the actual scope of the invention.

I claim:
1. For use with threshing cylinders, an improved threshing concave comprising a plate having an arcuate configuration so as to be generally conformable to a cylindrical surface having an axis, said plate having opposite axial ends, said plate being of corrugate configuration along its arcuate extent to define a plurality of axially extending, alternate and contiguous valleys and substantially flat topped ridges spacing such valleys with each of said flat topped ridges being disposed to be substantially tangential to said cylindrical surface and being substantially equidistant from said axis and with all the valleys being of substantially equal depth relative to the flat topped ridges, said plate being integral and of substantially uniform wall thickness throughout its arcuate extent with such thickness being substantially less than the depth of the valleys, an elongated rasp bar removably disposed in each of said valleys in parallelism with said axis, with each pair of adjacent rasp bars being spaced by the flat topped ridge intermediate the valleys in which such rasp bars are disposed, each of said rasp bars including a web having an integral, upstanding, longitudinally extending row of longitudinally spaced teeth thereon, with the web of each rasp bar substantially filling the valley in which the rasp bar is disposed and with each web having upper and opposite lateral edges substantially contiguous with the flat topped ridges on the opposite sides thereof, means extending through the plate releasably securing the rasp bars to the plate, said row of teeth on each web projecting toward said axis, with the teeth of all the rasp bars terminating in their projection toward the axis substantially equidistant from the latter and in closer proximity thereto than the flat topped ridges, and arcuate mounting flanges extending along substantially the entire arcuate extent of the plate and fixed to the opposite axial ends of the latter for reinforcing the latter against bending about its axial extent and also for mounting the same in operative relationship to a threshing cylinder.

2. The combination of claim 1, wherein the flat topped ridges are imperforate.

3. The combination of claim 1, wherein the flat topped ridges are perforate.

References Cited by the Examiner

UNITED STATES PATENTS

| 2,457,680 | 12/1948 | Johnson | 130—27.10 |
| 2,715,404 | 8/1955 | Tillery | 130—27.10 |
| 2,771,077 | 11/1956 | Karlsson et al. | 130—27.9 |
| 3,092,115 | 6/1963 | Morgan | 130—27.9 |

FOREIGN PATENTS

| 21,327/29 | 5/1930 | Australia. |
| 212,411 | 2/1958 | Australia. |

ABRAHAM G. STONE, *Primary Examiner.*

ANTONIO F. GUIDA, T. GRAHAM CRAVER, JOE O. BOLT, *Examiners.*